United States Patent [19]

Zipp et al.

[11] 4,436,869
[45] Mar. 13, 1984

[54] PRODUCTION OF CLOSED-CELL POLYURETHANE MOLDINGS HAVING A DENSIFIED SURFACE ZONE

[75] Inventors: Otmar Zipp, Osnabruecke; Heinz Bollmann, Alfhausen; Herbert Stutz, Karlsruhe; Wolfgang Scholz, Lemfoerde, all of Fed. Rep. of Germany

[73] Assignee: Elastogran GmbH, Fed. Rep. of Germany

[21] Appl. No.: 363,406

[22] Filed: Mar. 30, 1982

[30] Foreign Application Priority Data

Apr. 4, 1981 [DE] Fed. Rep. of Germany ....... 3113690

[51] Int. Cl.$^3$ ............................................. C08G 18/14
[52] U.S. Cl. ..................... 525/51; 525/107; 525/108; 525/110; 525/112; 525/114; 525/116; 525/117; 525/120; 525/122; 525/132; 525/155; 525/159; 525/170; 525/172
[58] Field of Search ................. 521/51, 107, 108, 110, 521/112, 114, 116, 117, 120, 122, 132, 155, 159, 170, 172

[56] References Cited

U.S. PATENT DOCUMENTS 3,042,631 7/1962 Strandskov ........................... 260/2.5
3,632,707 1/1972 Rice ...................................... 521/51

FOREIGN PATENT DOCUMENTS 23646 of 0000 European Pat. Off. .
1388551 of 0000 France .
1599325 of 0000 France .
2031632 of 0000 France .
1120425 of 0000 United Kingdom .
1209243 of 0000 United Kingdom .

OTHER PUBLICATIONS

Rubber Age, (May 1966), pp. 76–80.

Primary Examiner—Lester L. Lee
Attorney, Agent, or Firm—Keil & Witherspoon

[57] ABSTRACT

A process for the preparation of moldings, in particular resilient elements, which by virtue of a densified surface zone with substantially closed cells, have only a low water absorption, wherein a mixture comprising:
(a) 100 parts by weight of an NCO-containing prepolymer, having an NCO content of from 3 to 6% by weight and based on organic diisocyanates and substantially linear polyester-polyols or polytetramethylene ether glycol,
(b) from 0.5 to 1.6 parts by weight of water,
(c) one or more catalysts, preferably a tertiary amine, in an amount of from 0.01 to 2.0 parts by weight and
(d) assistants, with or without additives, is reacted in a closed mold, while undergoing densification, the surface temperature of the inner wall of the mold being from 50° to 70° C.

7 Claims, No Drawings

PRODUCTION OF CLOSED-CELL POLYURETHANE MOLDINGS HAVING A DENSIFIED SURFACE ZONE

Thermoplastic polyurethane elastomers based on predominantly linear polyester-polyols derived from aliphatic dicarboxylic acids and alkylene glycols, hydroxycarboxylic acids or polyether-polyols based on polytetrahydrofuran, have been disclosed. A survey of these polyurethane elastomers is given, for example, in "Urethanes in Elastomers and Coatings" Technomic Publishing Company 265 W. State St., West Port, Conn./USA 1973, pages 201-230, and in Kunststoff-Handbuch, volume VII, Polyurethane, by R. Vieweg and H. Höchtlen, Carl Hanser-Verlag, Munich 1966, pages 206 et seq.

It is also known that polyurethane foams having a dense, non-porous outer skin and a foam cure, and referred to as integral foams, can be prepared. The basic principles, processing and use of such foams is described, for example, in the monograph entitled "Integralschaumstoffe" by H. Piechota and H. Röhr, Carl Hanser-Verlag, Munich and Vienna, 1975.

According to British Pat. No. 1,209,243, hard polyurethane integral foams are produced by reacting organic polyisocyanates and compounds having a plurality of reactive hydrogen atoms in the presence of at most 0.2 mole, per 100 g of the hydrogen-containing compounds, of a low-boiling solvent as the blowing agent; in this process, the sum of the density of the non-densified foam produced and the degree of densification is from 1.45 to 8.15, the corresponding product of the density and the degree of densification is from 0.2 to 1.2 and the foamable reaction mixture is introduced into a mold whose surface temperature is not less than 60° C. below the maximum reaction temperature.

A review of flexible integral foams has also been published in "Advances in Urethane Science and Technology" volume 2, 1973, pages 203 et seq. (Technomic Publication, Technomic Publishing Co., 265 W. State St., Westport Conn. 06880).

Rubber Age, May 1966, pages 76-80, describes a method for the preparation of microcellular polyurethane rubbers from NCO-containing prepolymers, based on toluylene diisocyanate and polytetramethylene ether glycol, and diamines as chain lengtheners.

In the processes referred to, the blowing agent is in every case an inert, low-boiling, organic solvent, since only in this way can a dense outer skin be achieved. The chain lengtheners employed are diols and diamines.

To produce cellular elastomers, the blowing agents are carbon dioxide resulting from the reaction of diisocyanates with water, nitrogen generated by thermally labile nitrogen compounds, and solvents (Kunststoff-Handbuch, volume VII, Polyurethane, by R. Vieweg and A. Höchtlen, pages 276 et seq.). It is a disadvantage of cellular elastomers which have been expanded with carbon dioxide that they have virtually exclusively open cells. Where closed-cell products are formed, with cells containing carbon dioxide, they shrink greatly even during production of the elastomer. Moreover, the cells burst under dynamic stress, and the elastomers can then absorb water.

It is an object of the present invention to provide a method of producing closed-cell polyurethane moldings which in particular are useful as resilient elements which can be stressed dynamically. The moldings are furthermore required to have a densified surface zone and a low water absorption even after numerous, ie. more than 100,000, alternating load cycles.

We have found that this object is achieved, surprisingly, by a process for the production of polyurethane moldings which have a densified surface zone and substantially closed cells by reacting organic polyisocyanates, polyols and water, wherein (a) 100 parts by weight of an NCO-containing prepolymer, having an NCO content of from 3 to 6% by weight and based on organic diisocyanates and substantially linear polyester-polyols or polytetramethylene ether glycol and (b) 0.5 to 1.6 parts by weight of water are mixed thoroughly in the presence of (c) one or more catalysts and (d) assistants, with or without additives, the resulting reaction mixture is introduced into a mold of which the inner wall has a surface temperature of from 50° C. to 70° C., the mold is closed and the mixture is allowed to harden whilst undergoing densification.

If a commercial stabilized NCO-containing prepolymer is mixed at 90° C. with a mixture of emulsifier, conventional amounts of catalyst and water, and the resulting foamable mixture is poured into a mold at room temperature and allowed to harden, the low-density moldings obtained usually have an open-cell structure. Moldings produced in this way and useful as resilient elements exhibit, for a volume of 110 cm$^3$ and a density of 0.45 g/m$^3$, a water absorption of about 60 g if compressed and then released under water.

It was therefore surprising and not foreseeable that the process according to the invention, using water as the blowing agent, should give moldings which, for the same volume and the same density, exhibit virtually no water absorption even on compression and subsequent release under water. Moreover, even after dynamic stressing, for example after 100,000 alternating load cycles (70% compression and release), no significant increase in water absorption is observed. Moreover, there was no effect on the spring characteristics due to ice formation in the molding.

As regards the starting materials which, according to the process of the invetion, can be converted to moldings having substantially closed cells and a densified surface zone, the following may be noted.

Suitable polyols for the preparation of the NCO-containing prepolymers are polytetramethylene ether glycols and, preferably, substantially linear polyester-polyols, especially polyester-diols having OH numbers of from 20 to 225, preferably from 35 to 120. The polyester-polyols can be used as individual components or as mixtures.

Suitable substantially linear polyester-polyols can be prepared, for example, from dicarboxylic acids of 2 to 12 carbon atoms and dihydric alcohols. Examples of suitable dicarboxylic acids are aliphatic acids, eg. succinic acid, glutaric acid, adipic acid, suberic acid, azelaic acid and sebacic acid, and aromatic acids, such as phthalic acid, isophthalic acid and terephthalic acid. The dicarboxylic acids can be employed individually or as mixtures. In preparing the polyester-polyols it may in certain cases be advantageous to use, in place of the carboxylic acids, the corresponding carboxylic acid derivatives, such as esters with alcohols of 1 to 4 carbon atoms, anhydrides or acid chlorides. Examples of suitable dihydric alcohols are glycols of 2 to 16 carbon atoms, preferably of 2 to 6 carbon atoms, eg. ethylene glycol, diethylene glycol, butane-1,4-diol, pentane-1,5-diol, hexane-1,6-diol, decane-1,10-diol, 2,2-dimethylpropane-1,3-diol, propane-1,3-diol and dipropylene glycol. Depending on the desired properties, the dihydric alcohols may be used as individual compounds or as mixtures with one another. Other suitable dihydric alcohols are hydroxyl-containing polyesters of carbonic acid with the above glycols, especially with those of 4 to 6 carbon atoms, eg. butane-1,4-diol and/or hexane-1,6-diol, condensates of ω-hydroxycarboxylic acids, eg. ω-hydroxycaproic acid and, preferably, polymerization products of lactones, for example of unsubstituted or substituted ε-caprolactones.

Preferred polyester-polyols are poly(ethylene glycol adipates), poly(1,4-butanediol adipates), poly(ethylene glycol/butanediol adipates), poly(hexane-1,6-diol/neopentyl glycol adipates), poly(hexane-1,6-diol/butane-1,4-diol adipates) and polycaprolactones.

The organic polyisocyanates used are preferably aromatic diisocyanates. Examples include 4,4'-diphenyl diisocyanate, 3,3'-dimethyl-4,4'-diphenyl diisocyanate, p-phenylene diisocyanate, 2,4-toluylene diisocyanate, mixtures of 2,4- and 2,6-toluylene diisocyanate, 4,4'-diphenylmethane diisocyanate, urethane-modified liquid 4,4'-diphenylmethane diisocyanates, mixtures of 2,4'- and 4,4'-diphenylmethane diisocyanate and, preferably, 1,5-naphthylene diisocyanate.

To prepare the NCO-containing prepolymers (a), the organic diisocyanates and the polyester-polyols or polytetramethylene ether glycol are reacted at from 60° C. to 160° C., preferably from 90° C. to 150° C., especially from 120° C. to 150° C. The reaction is carried out in the presence or absence of conventional catalysts, for example tertiary amines and/or metal salts. The prepolymers obtained have NCO-contents of from 3 to 6% by weight, preferably from 3.5 to 4.5% by weight, and viscosities, at 90° C., of from about 2,000 to 6,000 mPa.s, preferably 2,500 to 4,500 mPa.s. The products have a long shelf life at room temperature if moisture is excluded.

To prepare the cellular moldings, the blowing agent used is solely water, in an amount of from 0.5 to 1.6, preferably from 0.6 to 1.2, parts by weight per 100 parts by weight of the prepolymer having an NCO content of from 3 to 6% by weight; these figures correspond to an NCO: OH ratio of from 0.8:1 to 1.3:1.

To accelerate the reaction between the NCO-containing prepolymers and water, a tertiary amine is preferably used as the catalyst. Specific examples are dimethylcyclohexylamine, dimethylbenzylamine, N-methylmorpholine, N-ethylmorpholine, N,N'-dimethylpiperazine, pyridine, 1,2-dimethylimidazole, pentamethyldiethylenetriamine, 1-methyl-4-dimethylaminoethylpiperazine and diazabicyclo-(2,2,2)-octane. The amount of catalyst essentially depends on the reactivity of the components and the activity of the catalyst, and should advantageously be chosen so that during mixing and during filling of the mold no reaction occurs, whilst, on the other hand, the molding obtained after a reaction time of from 10 to 30 minutes is sufficiently hardened that it can be demolded. The use of from 0.01 to 2.0 parts by weight of catalyst per 100 parts by weight of NCO-containing prepolymer has proved advantageous, a preferred amount being from 0.05 to 1.0 part by weight per 100 parts by weight of prepolymer.

It has also proved advantageous to employ assistants and/or additives when preparing the closed-cell moldings. Examples include surfactants, cell regulators, flameproofing agents, hydrolysis stabilizers, light stabilizers, heat stabilizers, color stabilizers, dyes, pigments, inorganic fillers and organic fillers.

For example, surfactants may be used, which assist homogenization of the starting materials and may also serve to regulate the cell structure of the cellular polyurethane elastomers. Examples of such surfactants include siloxane-oxyalkylene copolymers and other organopolysiloxanes, oxyethylated alkylphenols, oxyethylated fatty alcohols, polyoxyethylene esters, paraffin oils, castor oil, castor oil esters and turkey red oil; these are used in amounts of from 0.01 to 2.0, preferably from 0.1 to 1.0, parts by weight per 100 parts by weight of NCO-containing prepolymer. The use of siloxane-oxyalkylene copolymers is preferred.

Examples of suitable flameproofing agents are tricresyl phosphate, tris-2-chloroethyl phosphate and tris-chloropropyl phosphate.

In addition to the above halogen phosphates, inorganic flameproofing agents, eg. red phosphorus, antimony trioxide, arsenic oxide, ammonium phosphate, calcium sulfate and melamine, may also be used to flameproof the polyurethane elastomers. In general, it has proved advantageous to use from 5 to 50 parts by weight, preferably from 5 to 25 parts by weight, of the above flameproofing agent per 100 parts by weight of the NCO-containing prepolymer.

Further details of the above assistants and additives may be found in the appropriate literature, for example the monograph by J. H. Saunders and K. C. Frisch "High Polymers", Volume XVI, Polyurethanes, Parts 1 and 2. Interscience Publishers, 1962 and 1964 respectively.

To prepare the cellular moldings, the NCO-containing prepolymers are heated to about 60°–120° C., preferably 80°–110° C., and are compounded thoroughly, at this temperature, with a mixture of water, catalyst and assistants, with or without additives. An amount of the reactive mixture which corresponds to the required density of the molding is introduced into a mold, the inner wall of which is at a surface temperature of from 50° to 70° C., preferably from 55° to 65° C., the mold is closed and the mixture is allowed to harden whilst undergoing densification. The moldings obtained can be demolded after about 10–40 minutes.

The molds used are preferably metal molds which are brought to a constant temperature. The heat of reaction liberated causes a slight temperature rise of the mold surface at the start of the hardening process, but this rise is rapidly dealt with by the mold temperature control medium.

The moldings produced according to the invention have overall densities of from 250 to 800 g/liter, preferably from 300 to 500 g/liter. They have a substantially closed-cell structure, with a densified surface zone which is about 0.1–3 mm thick and has a density of about 500–1,000 g/liter. The water absorption of the moldings is very low. Even after more than 100,000 alternating load cycles, the moldings do not show evidence of cell rupture in the surface zone. The moldings are preferably used as resilient elements, for example in automotive construction, where they additionally serve to protect the metal components.

In the Examples, parts are by weight.

EXAMPLE 1

(a) Preparation of the NCO-containing prepolymer 1,000 parts of a poly(ethylene glycol adipate) having an OH number of 56 were dehydrated for 2 hours, at 120° C. and 50 mbar in a stirred flask equipped with a stirrer, thermometer and reduced pressure connection. 240 parts of 1,5-naphthylene diisocyanate were then added to the polyester-polyol at 130° C., with vigorous stirring, and the reaction was completed in 20 minutes at 130° C. The mixture was then allowed to cool to 90° C. in the course of one hour. 1,240 parts of a prepolymer having an NCO content of 4.0% and a viscosity of 3,800 mPa.s at 90° C. were obtained.

(b) To prepare the molding, 160 g of the prepolymer described under (a), at 90° C., were mixed thoroughly with 3.45 g of a mixture, at 50° C., of 1.4 parts of water, 0.05 part of triethylenediamine, 1.4 parts of the Na salt of turkey red oil and 0.6 part of Silicone Stabilizer 131 (from Dow Corning). After homogenization, the reactive mixture was poured into an aluminum mold of internal size 21.2×5.5×3.0 cm which had an internal surface temperature of 60° C., and the mold was closed. The molding, which it was possible to demold after 30 minutes, had the following mechanical properties:
Overall density [g/liter]: 454
Densified surface zone
  thickness [mm]: 2
  density [g/liter]: 700
Density of the core [g/liter]: 330
Water absorption after 100,000 alternating load cycles of 70% compression/release, at 2 Hz [g]: 5

EXAMPLE 2

(a) Preparation of the NCO-containing prepolymer 1,000 parts of a poly(1:1 ethylene glycol/butane-1,4-diol adipate) having an OH number of 56 were dehydrated for 2 hours, at 120° C. and 50 mbar in a stirred flask equipped with a stirrer, thermometer and reduced pressure connection. 250 parts of 1,5-naphthylene diisocyanate were then added to the polyester-polyol at 126° C., with vigorous stirring, and the reaction was completed in 30 minutes at 128° C. The mixture was then allowed to cool to 86° C. in the course of one hour. 1,250 parts of a prepolymer having an NCO content of 4.25% and a viscosity of 3,100 mPa.s at 86° C. were obtained.

(b) To prepare the molding, 160 g of the prepolymer described under (a), at 85° C., were mixed thoroughly with 4.05 g of a mixture, at 55° C., of 1.5 parts of water, 0.05 parts of pentamethyldiethylenetriamine, 1.5 parts of ®Lutensol ON 50 D (from BASF Aktiengesellschaft) and 1.0 part Silicone Stabilizer B 840 (from Goldschmidt). After homogenization, the reactive mixture was poured into an aluminum mold of internal size 21.2×1.5×3.0 cm which had an internal surface temperature of 55° C., and the mold was closed. The molding, which it was possible to demold after 25 minutes, had the following mechanical properties:
Overall density [g/liter]: 454
Densified surface zone
  thickness [mm]: 2
  density [g/liter]: 600
Density of the core [g/liter]: 360
Water absorption after 100,000 alternating load cycles of 60% compression/release at 2 Hz [g]: 8

EXAMPLE 3

(a) Preparation of the NCO-containing prepolymer 1,000 parts of a poly(1:1 hexane-1,6-diol/butane-1,4-diol adipate) having an OH number of 56 were dehydrated for 2 hours, at 120° C. and 50 mbar in a stirrer flask equipped with a stirrer, thermometer and reduced pressure connection. 240 parts of 1,5-naphthylene diisocyanate were then added to the polyester-polyol at 133° C., with vigorous stirring, and the reaction was completed in 10 minutes at 133° C. The mixture was then allowed to cool to 100° C. in the course of one hour. 1,240 parts of a prepolymer having an NCO content of 3.9% and a viscosity of 3,200 mPa.s at 100° C. were obtained.

(b) To prepare the molding, 160 g of the prepolymer described under (a), at 100° C., were mixed thoroughly with 3.45 g of a mixture, at 50° C., of 1.4 parts of water, 0.03 parts of 1-methyl-4-dimethylaminoethylpiperazine, 1.4 parts of Na salt of turkey red oil (emulsifier) and 1.4 parts of Silicon Stabilizer L 532 (from BP). After homogenization, the reactive mixture was poured into an aluminum mold of internal size 21.2×5.5×3.0 cm which had an internal surface temperature of 52° C., and the mold was closed. The molding, which it was possible to demold after 20 minutes, had the following mechanical properties:
Overall density [g/liter]: 453
Densified surface zone
  thickness [mm]: 3
  density [g/liter]: 700
Density of the core [g/liter]: 300
Water absorption after 100,000 alternating load cycles of 60% compression/release at 2 Hz [g]: 2

EXAMPLE 4

(a) Preparation of the NCO-containing prepolymer 1,000 parts of a polytetrahydrofuran having an OH number of 112 were dehydrated for 2 hours, at 120° C. and 50 mbar in a stirred flask equipped with a stirrer, thermometer and reduced pressure connection. 360 parts of 1,5-naphthylene diisocyanate were then added to the polyester-polyol at 125° C., with vigorous stirring, and the reaction was completed in 20 minutes at 130° C. The mixture was then allowed to cool to 100° C. in the course of one hour. 1,300 parts of a prepolymer having an NCO content of 4.1 and a viscosity of 2,500 mPa.s at 90° C. were obtained.

(b) To prepare the molding, 160 g of the prepolymer described under (a), at 90° C., were mixed thoroughly with 3.45 g of a mixture, at 55° C., of 1.4 parts of water, 0.05 part of pentamethyldiethylenetriamine and 1.4 parts of ®Lutensol DN 50 D (from BASF Aktiengesellschaft). After homogenization, the reactive mixture was poured into an aluminum mold of internal size 21.2×5.5×3.0 cm which had an internal surface temperature of 56° C., and the mold was closed. The molding, which it was possible to demold after 30 minutes, had the following mechanical properties:
Overall density [g/liter]: 454
Densified surface zone
  thickness [mm]: 3
  density [g/liter]: 700
Density of the core [g/liter]: 300
Water absorption after 100,000 alternating load cycles of 60% compression/release at 2 Hz [g]: 3

We claim:

1. A process for the production of polyurethane moldings which have a densified surface zone and substantially closed cells by reacting organic polyisocyanates, polyols and water, wherein
   (a) 100 parts by weight of an NCO-containing prepolymer, having an NCO content from 3 to 6% by weight, said polymer being prepared by reacting organic diisocyanates and substantially linear polyester-polyols or polytetramethylene ether glycol and
   (b) 0.5 to 1.6 parts by weight of water are mixed thoroughly in the presence of
   (c) one or more catalysts
   (d) one or more surfactants, cell regulators, flameproofing agents, stabilizers, dyes, pigments, and fillers as assistants and/or additives,
the resulting reaction mixture is introduced into a mold of which the inner wall has a surface temperature of from 50° C. to 70° C., the mold is closed and the mixture is allowed to harden whilst undergoing densification.

2. The process of claim 1, wherein a polyester-diol having an OH number from 20 to 225 is used to prepare the prepolymer.

3. The process of claim 1, wherein the organic diisocyanate used is 1,5-naphthylene diisocyanate.

4. The process of claim 1, wherein the catalyst used is a tertiary amine.

5. The process of claim 4, wherein the tertiary amine is used in an amount of from 0.01 to 2 parts by weight per 100 parts by weight of the NCO-containing prepolymer.

6. The process of claim 1, wherein the polyurethane molding has a density of from 250 to 800 g/liter.

7. The process of claim 1, wherein the polyurethane molding is a resilient element.

* * * * *